United States Patent [19]

Hofbauer

[11] Patent Number: 4,997,251
[45] Date of Patent: Mar. 5, 1991

[54] OPTICAL SYSTEM CONSISTING OF AT LEAST TWO PARTIAL SYSTEMS

[76] Inventor: Engelbert Hofbauer, Kirchplatz 6, D-8308 Pfeffenhausen, Fed. Rep. of Germany

[21] Appl. No.: 347,810
[22] PCT Filed: Aug. 26, 1988
[86] PCT No.: PCT/DE88/00523
§ 371 Date: Jun. 7, 1989
§ 102(e) Date: Jun. 7, 1989
[87] PCT Pub. No.: WO89/02090
PCT Pub. Date: Mar. 9, 1989

[30] Foreign Application Priority Data

Aug. 27, 1987 [DE] Fed. Rep. of Germany ....... 3728688

[51] Int. Cl.[5] .................. G02B 6/26; G02B 6/36; G02B 6/32
[52] U.S. Cl. .................. 350/96.18; 350/96.20
[58] Field of Search ............ 350/96.15, 96.18, 96.20, 350/96.21, 96.22

[56] References Cited

U.S. PATENT DOCUMENTS

| 4,257,672 | 3/1981 | Balliet | 350/96.17 |
|---|---|---|---|
| 4,616,899 | 10/1986 | Schlafer | 350/96.18 |
| 4,753,510 | 6/1988 | Sezerman | 350/96.18 X |
| 4,798,428 | 1/1989 | Karim et al. | 350/96.18 |
| 4,836,635 | 6/1989 | DeAmorim | 350/96.18 |
| 4,842,355 | 6/1989 | Gold et al. | 350/96.20 X |

FOREIGN PATENT DOCUMENTS

| 0286474 | 6/1914 | Fed. Rep. of Germany . |
|---|---|---|
| 3413748A1 | 2/1984 | Fed. Rep. of Germany . |
| 3300902 | 7/1984 | Fed. Rep. of Germany . |
| 3433717A1 | 7/1984 | Fed. Rep. of Germany . |
| 2081963 | 2/1982 | United Kingdom . |

OTHER PUBLICATIONS

Karl Mutze et al., "ABC Der Optik", 1961, FIG. 2.

Primary Examiner—Akm Ullah
Attorney, Agent, or Firm—Antonelli, Terry, Stout & Kraus

[57] ABSTRACT

The invention relates to an optical system consisting of at least two partial systems. The partial systems can be adjusted relative to each other over an adjusting element which they abut over a sliding surface and can be fixed in place by glue. Here the adjusting element has the form of a cylinder and is positioned between the partial systems so that the optical axis of one partial system travels through the adjusting element parallel to the cylinder axis. One of the partial systems possesses sliding surfaces whose forms are matched to the form of the sliding surfaces which lie in the cylinder top surface of the adjusting element. The adhesion spots in the cylinder top surface are spread uniformly along the cylinder circumference.

12 Claims, 2 Drawing Sheets

OPTICAL SYSTEM CONSISTING OF AT LEAST TWO PARTIAL SYSTEMS

BACKGROUND OF THE INVENTION

The invention relates to an optical system consisting of at least two partial systems which are adjustable relative to each other with an adjusting element with at least two sliding surfaces where each partial system possesses at least one sliding surface, over which it abuts a sliding surface of the adjusting element and where each partial system can be fixed in position on the adjusting element.

A process to couple optical components is known from DE-OS No. 34 33 717. Here two partial systems are connected to an adjusting device by a metallic structural connection such as welding or soldering. In this way a relatively large amount of heat is introduced into the optical system. Due to the heat introduction and the material liquidization it can come to undesired depositions. The connection points between the partial systems and the adjusting element must therefore be positioned as far as possible from the optical components so that a compact construction is not possible. A rotation around the optical axis is not possible after the fixing of the optical components on the carrier body. It is time-consuming to apply the required coatings for the known process. In addition, very exactly manufactured adjusting elements and carrier bodies are required to keep the tolerances given.

Due to the non cylinder-symmetrical construction, the stability against temperature influences and mechanical vibrations or similar cannot be compared with stability of cylinder-symmetrical holders for optical components.

In addition, optical systems are known which consist of only two partial systems. They are adjusted by moving the one partial system, consisting, for example, of a lens element system with mount, relative to the other partial system in different adjustment directions until the two partial systems have assumed an optimum position. In this position, the two partial systems are connected to each other in a material locking connection. An adhesion system is preferred to make the material locking connection as in soldering or welding, the optical system is subjected to relatively large amounts of heat which can cause undesired depositions inside the optical system. With an adhesive connection, heat introduction is avoided, but adhesive materials shrink during bonding. To keep any disadjustment of the optical system due to to adhesive shrinking as low as possible, adhesive materials are used which only shrink minimally during bonding, for example by 1 to 2%. However, such adhesives have the disadvantage that bonding takes a relatively long time.

With certain optical systems the required adjustment precision cannot even be obtained with adhesives which only shrink a little:

This is, for example, the case with an optical system which contains a laser diode and a collimating lens element system. The laser diode and the collimating lens element system can be mounted in separate mounts. In many application cases, it is now required to position these two partial systems with reference to three directions with a precision in each case of less than 1 $\mu$m. To do this, the two partial systems consisting of laser diode with mount or lens element system with mount are first adjusted by a relative movement of both mounts and then glued. However, after the adjustment process the glue gaps between the mounts are not identical and are large. Even when an adhesive is used which only shrinks minimally, the shrinking process of the adhesive leads to a disadjustment of the optical system. Due to the shrinkage, the required precision limits can therefore not be maintained.

SUMMARY OF THE INVENTION

The object of the invention is to describe an optical system of the type first named above which permits as compact and as stable a construction as possible and where due to its design, a high adjustment precision is guaranteed even after the fixing of the two partial systems by a material-locking connection.

This object is obtained according to the invention by the adjustment element having the form of a cylinder and being positioned between the partial systems so that the optical axis of one partial system travels through the adjusting element essentially parallel to the cylinder axis with the adjusting element being able to transmit electromagnetic radiation at least in the area of the optical axis, by the sliding surface(s) of one partial system possessing a form matched to the form of the sliding surfaces which lie in the cylinder top surface of the adjusting element, and by adhesion spots being provided on the two partial systems and the adjustment element in the area of the sliding surfaces which abut one another, where the adhesion spots in the cylinder top surface are spread uniformly along the cylinder circumference.

According to the invention the partial systems are glued to the adjusting element. In this way, depositions due to heat introduction and material liquidisation are avoided. The shrinkage which occurs in the bonding of adhesives has no or only an insignificant effect on the adjusting precision. This is, among other things, due to the fact that the adhesion spots are spread uniformly between the partial system abutting the surface of the adjusting element and the adjusting element. Due to the uniform spread of the adhesion spots, powers which occur, compensate each other. Uniform spreading of the adhesion spots means, for example with a circular cylinder adjusting element, that the adhesion spots are positioned along the circle circumference at equal distances to each other. With an even number of adhesion spots this means that two adhesion spots are diametrically opposite to each other with reference to the cylinder axis. In principle, an adhesion spot which, for example, extends over the whole cylinder circumference is also imaginable. Due to the arrangement and the form of the adjusting element a compact, stable, i.e. cylinder-symmetrical, construction is possible. Furthermore, a rotation of one partial system against the other partial system around the optical axis is also possible.

This creates the conditions to be able to correct imaging errors, for example astigmatism.

With the proposed optical system it is possible to position the two partial systems gap-free on the adjusting element in the area of the material-locking connection. Gap-free means that at least the adhesive causing a connection can be introduced in a sufficient amount between the relevant sliding surfaces.

Each partial system and adjusting element area where these abut each other is designed as a sliding surface. These adjusting spots are designed for each adjustment direction in such a way that the corresponding value for each direction can be set by a sliding movement of the relevant sliding surfaces towards each other. The two partial systems of the proposes optical system do not abut each other directly and do not possess a connection point. According to the design of the sliding surfaces which abut one other a partial system can be tilted, turned or pushed against the adjusting element.

In principle, the adjusting element itself can be designed with several parts with the individual parts also being able to be moved relative to each other on sliding surfaces.

However, normally the adjusting element will be a rigid body.

As the sliding surfaces possess a form matched to each other, the gap-freedom between the sliding surfaces is also maintained after the performance of adjusting movements. Due to the gap-freedom any volume change in the material causing the material-locking connection results in practically no disadjustment. With the proposed system a very high adjustment precision is thus guaranteed even after the fixing of the two partial systems against the adjusting element.

Surprisingly, it was found that when fixing by adhesion even an adhesion system can be used which does not shrink only minimally but averagely, i.e. by approx. 10%, or even considerably, i.e. by e.g. 14%, with the required adjustment precision still being maintained. As a result, adhesion systems with very short bonding times can be used. This is of great economic importance: The partial systems are adjusted for example using manipulators. The partial systems must be held in these manipulators for so long till a fixed connection of the partial systems with the adjusting element has taken place. A short bonding time therefore means a correspondingly lower use of manipulators.

It was found that no qualitively high-grade surfaces need be used for the sliding surfaces, rather the surface quality obtainable by turning or optical grinding is sufficient.

In an advantageous embodiment of the invention the adjusting element is designed as an Abatsch wedge with one partial system abutting the plano-convex part and the other partial system abutting the plano-concave part of the Abatsch wedge.

If the adjusting element is designed as an Abatsch wedge, then the two partial systems can also be tilted against each other.

In preferred embodiments of the invention the adjusting element is a straight circular cylinder or a hollow cylinder. If the adjusting element is a hollow cylinder, then one of the partial systems can abut either the exterior surface or the interior surface of the hollow cylinder.

Here it has proven to be particularly advantageous if the sliding surface in the base surface of the cylinder and the sliding surface of the partial system matched to this sliding surface are circular in form. In this design, a rotationally symmetrical arrangement is given, i.e. the two partial systems can be rotated against each other. This movement possibility permits for example, astigmatism corrections to be performed using a cylinder lens element.

In an advantageous further embodiment of the invention, one of the partial systems possesses at least three arms at a distance to one another with one sliding surface each, over which each arm abuts a matching sliding surface in the peripheral area of the adjusting element. Particularly with an adjusting element in circular disk form the arms can be positioned on a cylindrical circumference rim of a partial system. If the arms show an angle distance of approx. 120°, then a secure hold of the partial system on the adjusting element can be obtained with three arms.

It was found that due to a self-centration by the material causing the material-locking connection the radius of the sliding surfaces in the arms and the radius of the matched sliding surfaces of the adjusting element need not be equally large to obtain the required adjusting precision. Thus, the partial system and the adjusting element can be manufactured with the usual production tolerances.

If the optical system in question is one with an optical axis which travels through the adjusting element, then the adjusting element in one embodiment of the invention transmits electromagnetic radiation at least in an area surrounding the optical axis.

In another embodiment of the invention, it proved to be particularly favorable if the adjusting element consists of a material which transmits electromagnetic radiation, particularly UV light, and if adhesion spots are provided on the partial systems and the adjusting element for an adhesion system which can be hardened by electromagnetic radiation or UV light.

By using adhesion systems which can be hardened by UV light, the bonding time can be kept extremely short. As the adjusting element consists of material which transmits UV, the adhesion spots can be subjected to UV light radiation easily via the adjusting element and the adhesive hardened. The adhesion spots can be subjected to UV light radiation particularly easily if one of the partial systems abuts the adjusting element over three or more arms.

A further preferred embodiment of the invention utilizes UV transmitting glass or UV transmitting ceramics for the adjusting element. Here, not only materials which transmit UV light are dealt with, but also electrical insulators. This is, for example, of advantage for opto-electronic systems such as the system utilizing a laser diode with a collimating lens element system as in this case the adjusting element also serves as the required insulation between laser diode mount and the mount of the lens element system. In principle, the principle according to the invention cannot only be applied to optical systems, but also to any other components which have to be adjusted and fixed exactly in relation to one another.

BRIEF DESCRIPTION OF THE DRAWINGS

In the following version examples of the invention are explained by means of schematic sketches.

DESCRIPTION OF THE PREFERRED EMBODIMENTS

In the figures matching components are given the same reference numbers.

Figure 1:
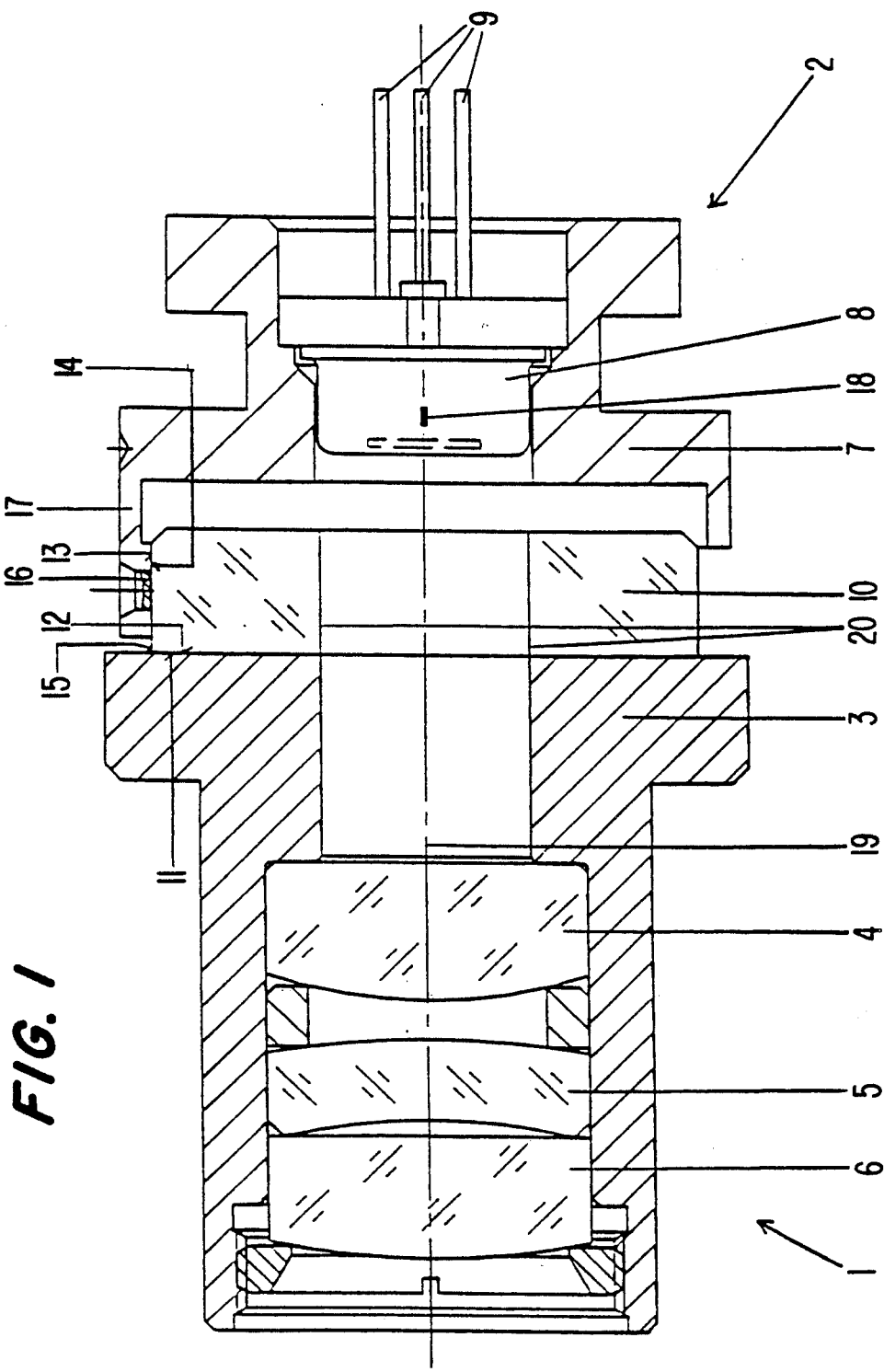
FIG. 1 shows an optical system with a circular cylindrical adjusting element.

In FIG. 1 an optical system consisting of two partial systems 1, 2 is shown in section. Partial system 1 consists essentially of three lens elements 4, 5, 6 which are mounted in a frame or mount 3. Partial system 2 consists essentially of a laser diode 8 which is mounted in a mount 7. Reference number 9 designates supply leads, and number 18 designates the laser element. The diode can be a transmitting or a receiving diode. The lens element system consisting of the lens elements 4, 5, 6 is a collimating optical system. The active surface of the diode 8 can be adjusted at the focal point of the collimating optical system. Preferably, the focal point of the collimating optical system should be adjusted with reference to the active surface of the diode in at least three directions (degrees of freedom) with a precision of more than 1 μm. An adjusting element 10 which is positioned between the partial systems serves to do this. The adjusting element is a rigid body in circular disk form which is, for example, made from glass. A partial area of the surface facing partial system 1 and parallel to the circular disk plane is designed as a sliding surface 12. This sliding surface 12 has a circular form. The circumference rim area of the adjusting element 10 is orientated perpendicular to the circular disk plane. Partial areas of this rim area are also designed as a sliding surface 14.

The frame or mount 3 of the partial system 1 possesses a surface parallel to the circular disk plane of the adjusting element 10.

In this surface a partial area is designed as a sliding surface 11. With reference to the optical axis of the lens system 4, 5, 6 with the reference number 19, the sliding surface 11 has a circular form. Partial system 1 abuts the sliding surface 12 of the adjusting element 10 over its sliding surface 11. The sliding surfaces 11, 12 possess a form matched to each other, i.e. they are parallel to each other and have the form of a circular ring with approximately equal exterior and equal interior diameter.

Partial system 2 possesses three arms 17 at its cylindrical circumference rim which have an angle distance of roughly 120°. Each arm 17 possesses a sliding surface 13 over which the arm abuts the matched sliding surface 14 in the circumference rim of the adjusting element in circular disk form. The sliding surfaces 13 and 14 possess circular arc form in a section perpendicular to the sign plane. The radii of the two circle arcs are matched to each other, i.e. are roughly of the same size.

This optical system now makes possible the following adjustment movements:

Partial system 1 can be pushed to a plane perpendicular to the sign plane relative to the adjusting element. Furthermore, the partial system 1 can be rotated around the optical axis 19 over the adjusting element 10.

Thanks to the sliding surface 14 of the adjusting element and the sliding surfaces 13 of the partial system 2, partial system 2 can be moved in a direction perpendicular to the circular disk plane against the adjusting element 10.

All in all, then, partial system 1 and partial system 2 can be moved relative to each other in three directions perpendicular to one another, i.e. the active surface of the laser diode 8 can be adjusted optimally at the focal point of the collimating optical system. In the adjusted position the two partial systems 1, 2 are fixed against the adjusting element 10. Several adhesion spots 15, 16 are provided for this. In principle, any adhesive can be used.

However, an adhesive is preferably used which can be hardened by UV light. After the application of the UV adhesive, UV light is directed on to the adhesion spots over the adjusting element consisting of glass and the adhesive hardened. The sliding surfaces 11 and 12 abut each other in the area of micro-roughness so that no undesired disadjustment in the direction perpendicular to the cylinder base surface is caused due to the shrinking of the adhesive during bonding, but also a high adjustment precision remains guaranteed after the adjustment of the two partial systems.

The sliding surfaces 13 and 14 need not always abut each other to prohibit a disadjustment as due to the constructive design of a self-centration of the adjustment element 10 is caused against the partial system 2. Due to the self-centration any distances which may be present between sliding surfaces matched to each other will be of equal size.

In addition, with sliding surfaces which do not abut each other and which may have different distances the arrangement of the adhesion spots compensates the powers which are due to the shrinking of the adhesive. For this reason, a high adjustment precision is also ensured in the directions parallel to the cylinder base surface even after the fixing of the two partial systems. An aperture (limiting surface 20) which is circular in its cross-section is provided in adjusting element 10.

Figure 2:
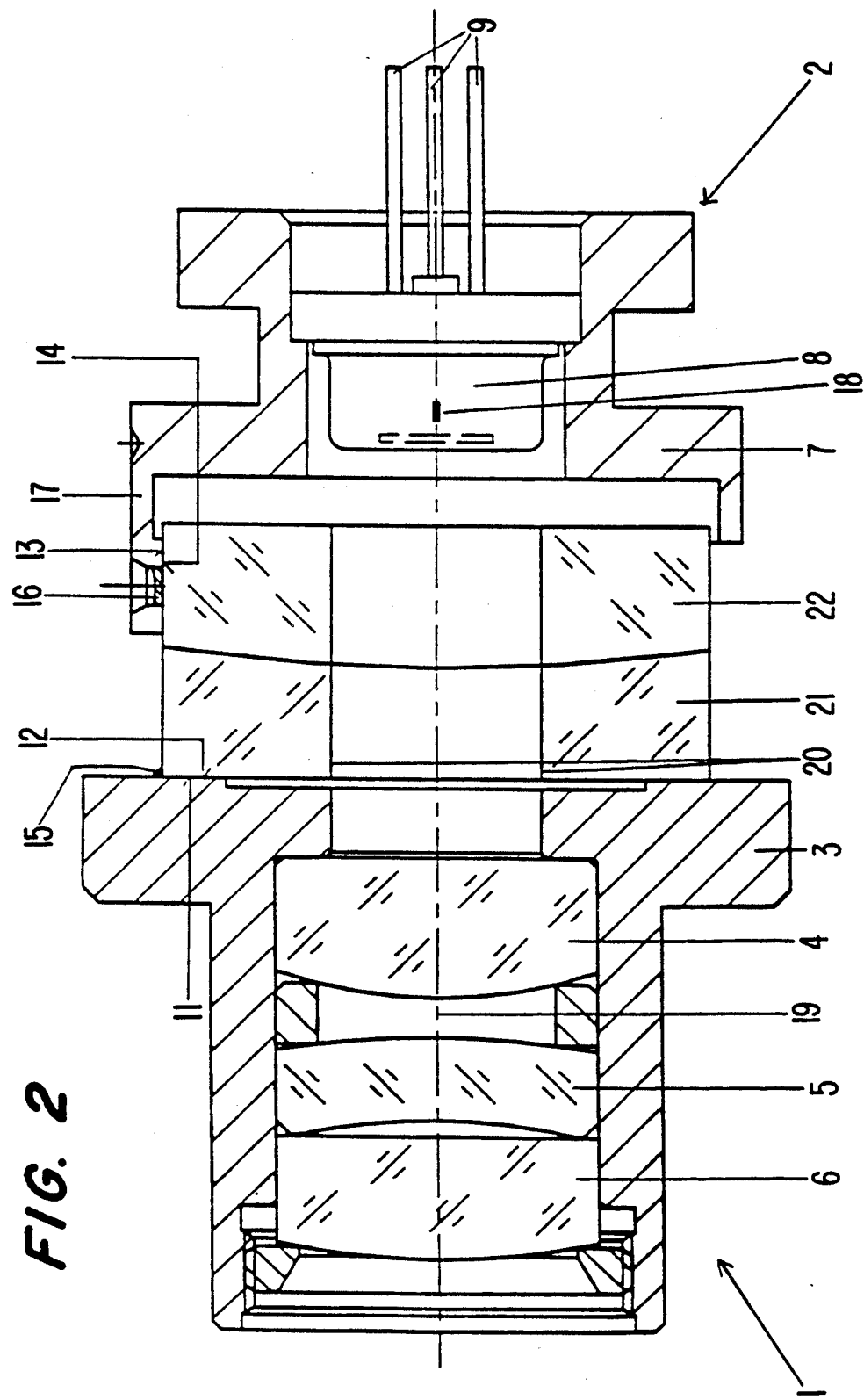
FIG. 2 shows an optical system with an adjusting element designed as an Abatsch wedge.

FIG. 2 shows an adjusting element designed as an Abatsch wedge. Partial system 1 is mounted on the plano-concave part 21 of the Abatsch wedge, partial system 2 on the plano-convex part 22 of the Abatsch wedge. Due to the tilting capability it is, for example, possible to correct an unsymmetrical radiation characteristic of a laser diode.

What is claimed is:

1. An optical system comprising at least two partial systems adjustable relative to each other and with respect to an adjusting element having at least two sliding surfaces, each partial system having at least one sliding surface abuting one sliding surface of the adjusting element and enabling fixing of a respective partial system to the adjusting element in the area of abutment of the sliding surfaces, the adjusting element including a cylindrical member positioned between the two partial systems so that an optical axis of one partial system extends through the adjusting element substantially in parallel to a cylindrical axis of the cylindrical member, the adjusting element at least in the region of the optical axis enabling transmission of electromagnetic radiation therethrough, at least one sliding surface of at least one of the two partial systems being configured with a shape matching the shape of the sliding surface lying in the cylindrical top surface of the adjusting element, and adhesion spots being provided in the area of abutment of the sliding surfaces of the two partial systems with the sliding surfaces of the adjusting element, the adhesion spots lying in the cylindrical top surface being uniformly distributed along the cylindrical circumference of the cylindrical member.

2. An optical system according to claim 1, wherein the adjusting element is a straight circular cylindrical member.

3. An optical system according to claim 1 or 2, wherein the adjusting element is a hollow cylindrical member.

4. An optical system according to claim 1, wherein the adjusting element has a sliding surface at the cylindrical base surface thereof which is circular in shape and the sliding surface of the one partial system arranged for abutment therewith is circular in shape.

5. An optical system according to claim 1, wherein one of the two partial systems includes at least three arm members spaced from one another, each arm member having one sliding surface arranged for abutment at a matched sliding surface in the surface of the adjusting element.

6. An optical system according to claim 1, wherein the adjusting element is an Abatsch wedge having a plano-convex part and a plano-concave part, one partial system abuting the plano-convex part and the other partial system abuting the plano-concave part.

7. An optical system according to claim 1, wherein the adjusting element comprises a material enabling transmission of the electromagnetic radiation, the adhesion spots being provided on at least one of the partial systems and the adjusting element so as to enable an adhesive material hardenable by electromagnetic radiation to be disposed thereat.

8. An optical system according to claim 7, wherein the material enabling transmission of electromagnetic radiation enables transmission of UV light.

9. An optical system according to claim 1, wherein the adjusting element comprises one of UV transmitting glass and UV transmitting ceramics.

10. An optical system according to claim 1, wherein one of the two partial systems includes a diode and a mounting member, and the other of the two partial systems includes an optical system with a mounting member.

11. An optical system according to claim 10, wherein the optical system is a collimating optical system.

12. An optical system according to claim 1, wherein the adjusting element comprises an electrically insulating material.

* * * * *

UNITED STATES PATENT AND TRADEMARK OFFICE
CERTIFICATE OF CORRECTION

PATENT NO. : 4,997,251

DATED : Mar. 5, 1991

INVENTOR(S) : Hofbauer

It is certified that error appears in the above-identified patent and that said Letters Patent is hereby corrected as shown below:

ON THE TITLE PAGE:

After "[76] Inventor: Engelbert Hofbauer, Kirchplatz 6, D-8308 Pfeffenhausen, Fed. Rep. of Germany"

insert:

--Assignee: Optische G. Rodenstock, Fed. Rep. of Germany--

Signed and Sealed this

Thirteenth Day of October, 1992

*Attest:*

DOUGLAS B. COMER

*Attesting Officer*  *Acting Commissioner of Patents and Trademarks*